N. THEOFILOS.
ELECTRIC HEATER.
APPLICATION FILED OCT. 13, 1920.
1,406,912.
Patented Feb. 14, 1922.
3 SHEETS—SHEET 3.
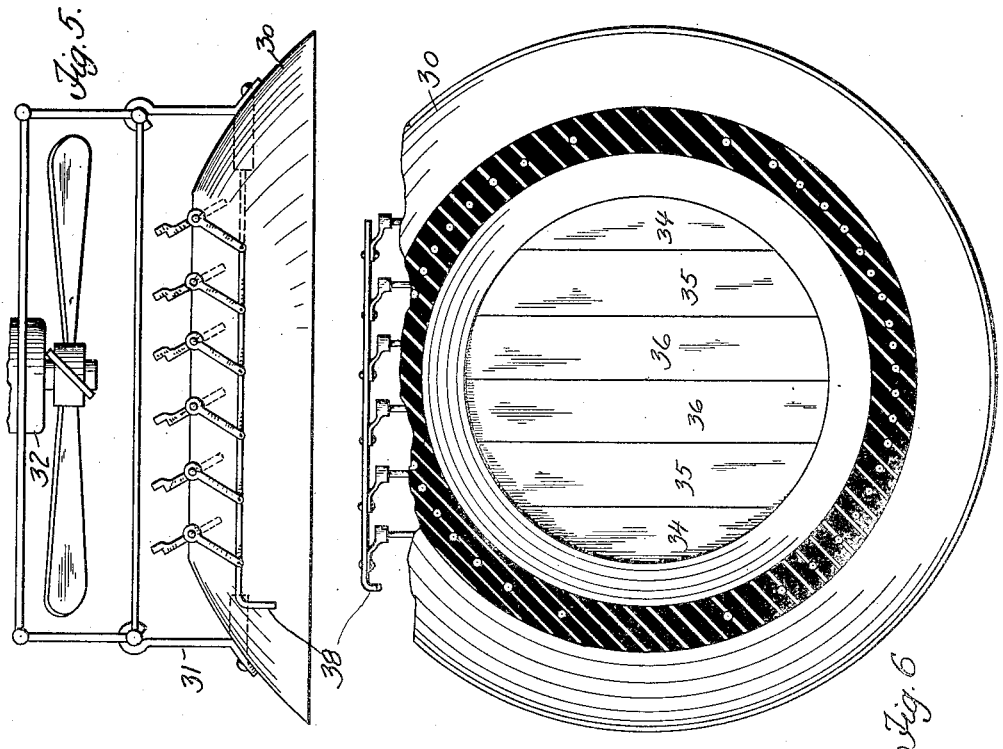
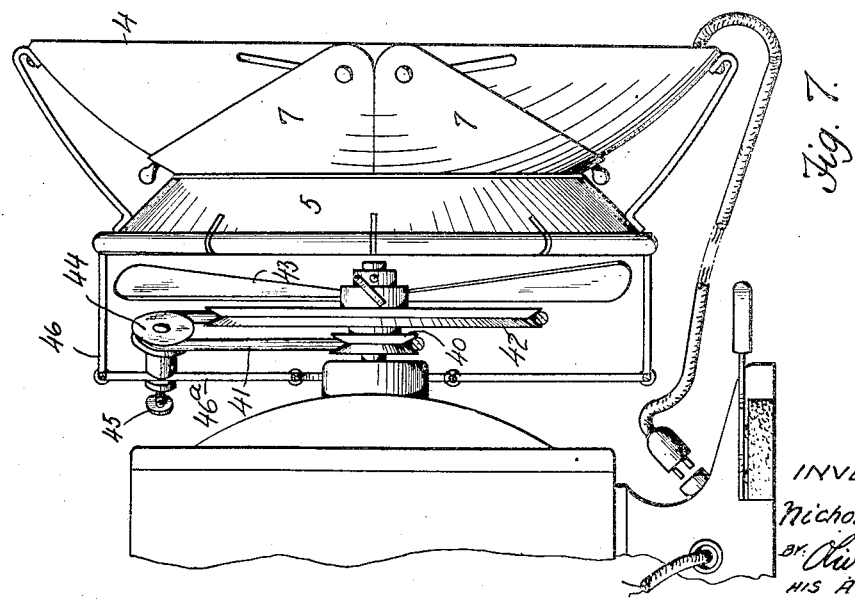
INVENTOR:
Nicholas Theofilos,
BY Oliver O. Martin
HIS ATTORNEY.

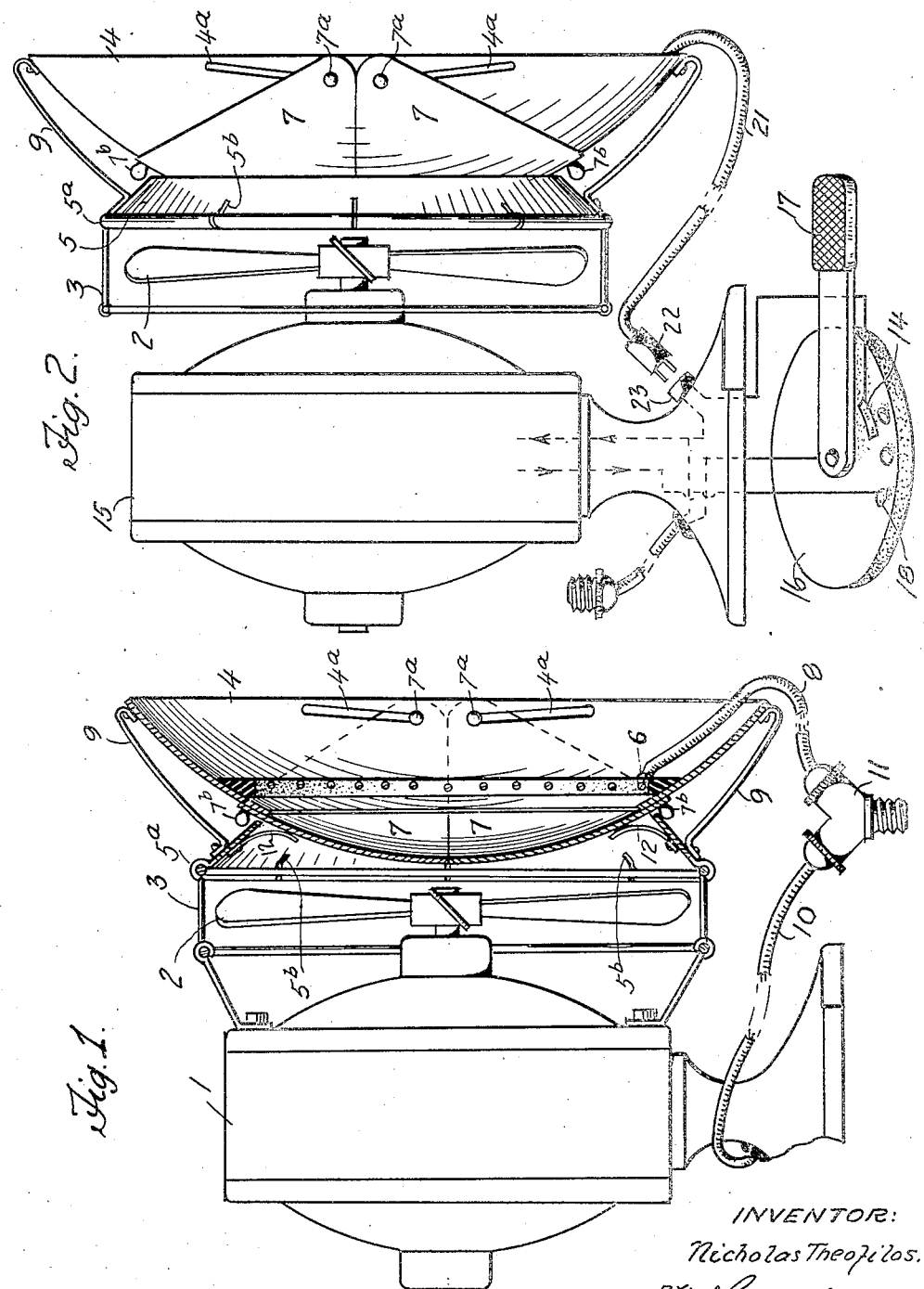

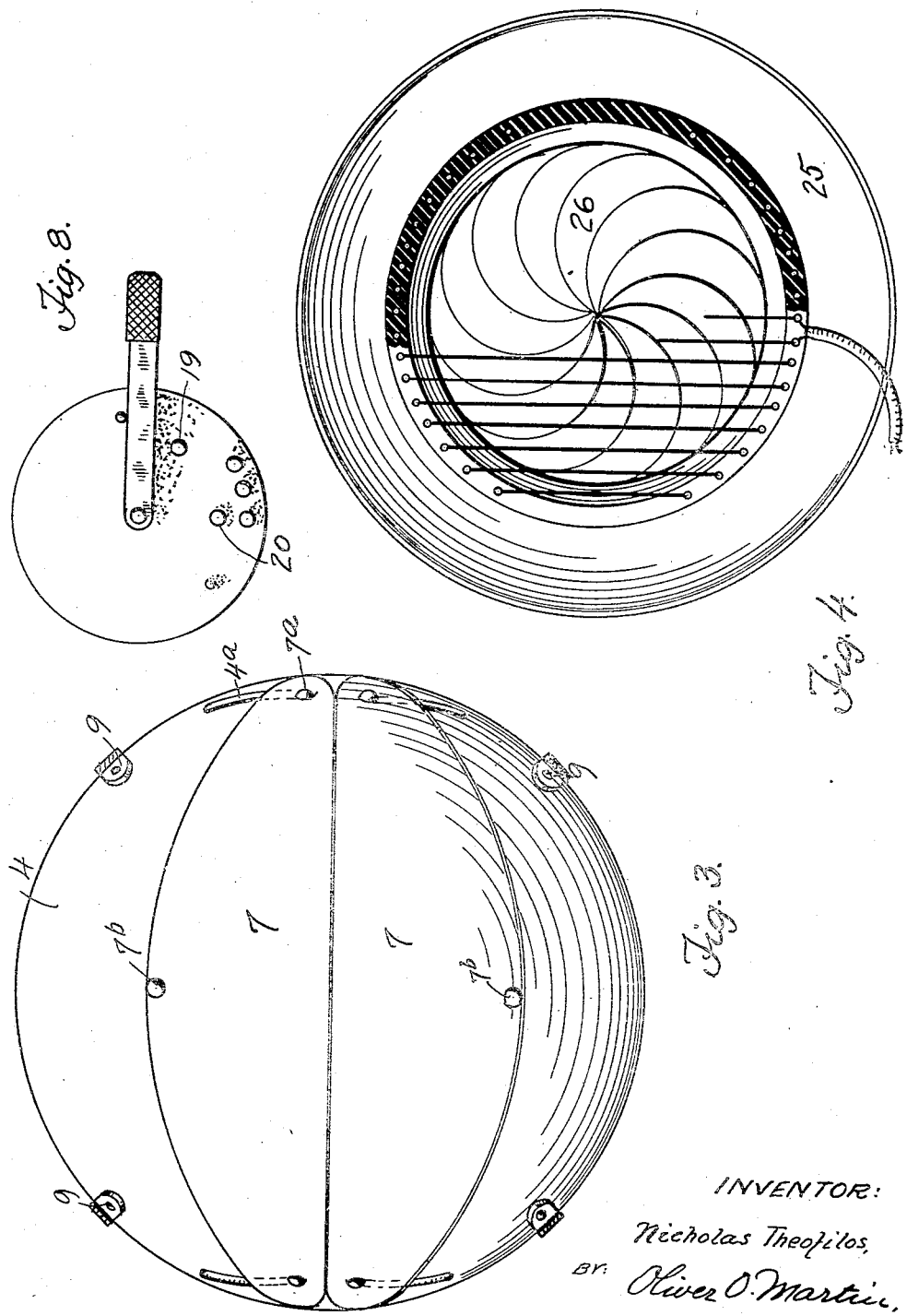

UNITED STATES PATENT OFFICE.

NICHOLAS THEOFILOS, OF CHICAGO, ILLINOIS.

ELECTRIC HEATER.

1,406,912.  Specification of Letters Patent.  Patented Feb. 14, 1922.

Application filed October 13, 1920. Serial No. 416,687.

*To all whom it may concern:*

Be it known that I, NICHOLAS THEOFILOS, a citizen of the United States, residing at Chicago, in the county of Cook and State of Illinois, have invented new and useful Improvements in Electric Heaters, of which the following is a specification.

This invention relates to a heating apparatus, and refers particularly to an attachment for electric fans.

Electric fans are much used in hot weather for carrying off excess bodily heat, but in cold weather, when a current of warm air, properly directed, would be a convenience and often a great blessing, they are not much used because of the many and varying conditions under which they would have to operate and for the reason that, to my knowledge, no structure has heretofore been provided containing the necessary elements required, and being flexible enough in its operation, to meet such varying conditions.

The object of my invention is the provision of a structure for supplying warm air in cold weather, and for creating a current of warm air. Furthermore it is my object to provide a structure attachable to an electric fan of standard or improved construction. A further object is the provision of means whereby I may use the attachment for heating purposes without operating the fan to which it is attached. Another object is to provide means for regulating the volume of air propelled by the fan past the heating attachment. I also aim to provide means for controlling the direction of the air current created by the fan and passing through the heating attachment. Finally I introduce devices for regulating the speed of the fan relative to its motor.

The aforenamed objects and the many important and advantageous features of the invention are hereinafter fully and clearly described, and drawings are hereto annexed exhibiting structures embodying the invention.

In the drawings:

Fig. 1 is a side elevation, partly in cross section, of a structure embodying the invention, Fig. 2 is a side elevation of a similar structure, and it discloses features not visible in and others not embodied in Fig. 1, Fig. 3 is a front elevation of the reflector of the structure, Fig. 4 illustrates a modified form of reflector, Figs. 5 and 6 illustrate a structure in which is introduced means for changing the angular direction of the air current passing through the device, Fig. 7 shows a structure embodying the invention, and indicates particularly means for reducing the speed of the fan propeller relative to its motor, and Fig. 8 is a detail of the electric starting control of the fan motor.

Referring in the first instance to Fig. 1, the numeral 1 denotes an electric motor provided with a fan propeller 2, and having the usual wire guard 3 encompassing said propeller. A bowl shaped reflector 4 is shown attached to the front of said wire guard by suitable means, which in this case take the shape of a conical ring 5 made with a curled edge $5^a$, said edge adapted to fit over the front of the wire guard 3 and having axial slots $5^b$ making the edge of the ring flexible in order that it may be able to spring into position on the wire guard, and also to yield when removed from said guard. The bowl 4 and ring 5 are rigidly combined by a plurality of braces 9, or their equivalent. The bowl structure comprises a solid, ring shaped portion 4, a centrally disposed shutter portion 7, and a heating element 6 rigidly affixed adjacent to the inner edge of said ring shaped portion. From the heating element extends a cable 8 to a plug 11, said plug insertable in a lamp or power socket in the customary fashion. The fan motor cable 10 may also conveniently terminate in the plug 11, as indicated in Fig. 1.

From the foreging description it becomes clear to those versed in the art, that the reflector bowl may be closed and an electric current sent through the heating element 6, in which case the device merely functions as a heater, such as quite commonly used, independent of a fan. The moment, however, that the bowl is opened, the fan may be started to blow a current of air past the heating element, whereupon the device becomes a warm air blower. And, of course, the entire heating attachment may quickly be removed from the fan, leaving the latter entirely unincumbered.

The shutter 7 of the reflector comprises two half-portions having pivots 7ª seated to slide in grooves or slots 4ª of the reflector ring and provided with finger knobs 7ᵇ for sliding said half-portions into open or closed position. It is noted that the inner edge of the cone shaped ring 5 is spaced from the reflector in order to afford the shutter leaves 7 room to move, and suitable means, such as resilient fingers 12 pressing against said leaves, serve to maintain the latter in adjusted position.

Turning now to Fig. 2, a motor 15 is again fitted to accommodate the reflector mechanism 4. At the bottom of said motor is shown a starting switch 16 having a contact segment 14 connected to one end of the heating element, aside from which the switch may remain substantially as ordinarily found in fan motors. The purpose of this segment is to close a circuit through the heating element at the beginning of rotation of the switch lever 17. A further rotation of said lever maintains the heating circuit closed and in addition closes the fan circuit, causing the fan to start at slow speed. Still further rotation of the lever causes the fan to increase its speed, simultaneously breaking the heating circuit. Some fans, however, start on high speed, and in such cases a pair of contact buttons 19, 20 (see Fig. 8) may be connected to carry the heating circuit. The cable 21, leading from the heating element, may conveniently terminate in a plug 22, and a corresponding socket is then placed in the motor base, thereby greatly facilitating the attachment and removal of the heating element.

In Fig. 4 is shown a reflector ring 25 fitted with a central closing mechanism 26, and the latter is substantially a copy of the well known iris shutter so commonly used in photographic cameras. This illustration is added in order to indicate that the simple two part shutter hereinbefore described may be refined and elaborated upon so as to afford a more pleasing appearance and also in order to maintain a circular opening at any adjustment of the shutter.

In contemplating the combinations and features hereinbefore described it is noted that I provide an attachable heating device operable without the assistance of the fan. Furthermore that I may start the fan and open a passage for the air current to carry off the heat generated, and that I may regulate the size of this passage to admit the desired amount of air. Also that I may control the heating circuit through the fan motor starting switch.

Some high grade fans are made to oscillate in order to distribute their effect over a larger area, but most fans do not possess this feature. In Fig. 5 and Fig. 6 I have introduced means for controlling the direction in which the warm air current is propelled. In this structure the reflector ring 30 may remain substantially unchanged in shape, and it may be directly secured to the motor 32, as per arms 31. The heating element is also mounted within the reflector in the manner described, but the shutter mechanism takes the shape of a series of parallel bars 34, 35, 36, said bars pivotally fixed on the inner edge of the reflector ring, and having each an arm hinged on an operating rod 38, by moving which the shutter may be swung open or closed, and be maintained open in various angular positions.

There is one more feature of the invention which I shall now explain, and which is embodied in the structure of Fig. 7. A high speed fan has too great an air propelling capacity, and for this reason may operate to carry off heat so fast that the heating element has not sufficient time to maintain itself hot. On the other hand, such capacity for moving air as is required in excessively hot weather, is not desired in low temperatures, where a more gentle action is preferable. With these conditions in view I introduce means for reducing the speed of the fan propeller relative to the motor, and such means is shown in Fig. 7 to take the form of a pulley 40, rigid on the motor shaft and connected by a belt 41 to rotate an adjacent loose pulley 42, which latter carries the propeller 43. The belt 41 is bent over two idlers 44, only one of which is shown in the drawing for the sake of clearness, but they are preferably alike, and each may conveniently be mounted to rotate on a clamp 45, which in turn are secured to the radial spacers, or spokes, 46ª of the fan guard 46. By varying the diameters of the two pulleys 40 and 42 the speed of the fan propeller may readily be adjusted to conform more nearly to the heating capacity of the heating element. Of course, more elaborate and more easily adjustable speed reducing means may be substituted, but it is thought that the pulley structure exhibited will be sufficient, as it has been found to operate satisfactorily.

I claim:

1. The combination with an electric fan, of a reflector attachable in front of said fan, a heating element within said reflector, and manually operated means for opening an air passage from the fan propeller to said heating element.

2. The combination with an electric fan, of a reflector attachable in front of said fan, a heating element within said reflector, and a manually operated shutter in the center of the reflector governing the air passage from the fan propeller to the heating element.

3. The combination with an electric fan, of an electric heater attachable to the front of the fan, means for opening an air passage from the fan and through said heater, and an electric control for directing current either to the fan or to the heater, or simultaneously to both fan and heater.

4. The combination with an electric fan, of a reflector attachable to the front of the fan, a heating element within said reflector, manual means governing a passage from the fan propeller to said heating element, and means for regulating the speed of said propeller relative to the speed of its motor.

5. The combination with an electric fan, of a heating device attachable in front of said fan, means for controlling the amount of air directed past said heating element, and means for reducing the speed of the fan propeller relative to the motor speed.

6. The combination with an electric fan, of a heating attachment mounted in front of the fan propeller, means for controlling the amount of air directed past said heating attachment, and means for varying the angular direction of the air blown through the heating attachment.

7. The combination with an electric fan, of a ring shaped reflector attachable to the fan guard, a heating element mounted within said reflector, and manually operated shutter leaves mounted to move on the reflector for opening and closing the central passage through said reflector.

8. The combination with an electric fan, of a ring shaped reflector, a conical ring attachable to the fan guard and secured to said reflector in spaced relation, a shutter mechanism for closing the passage through said reflector and operating in the space between the two rings, and an electric control for supplying current to the fan and to a heating element forming part of said reflector.

In testimony whereof I have hereunto affixed my signature.

NICHOLAS THEOFILOS.